June 24, 1930. J. P. HEIL 1,765,724
OIL PUMP
Filed Feb. 13, 1928
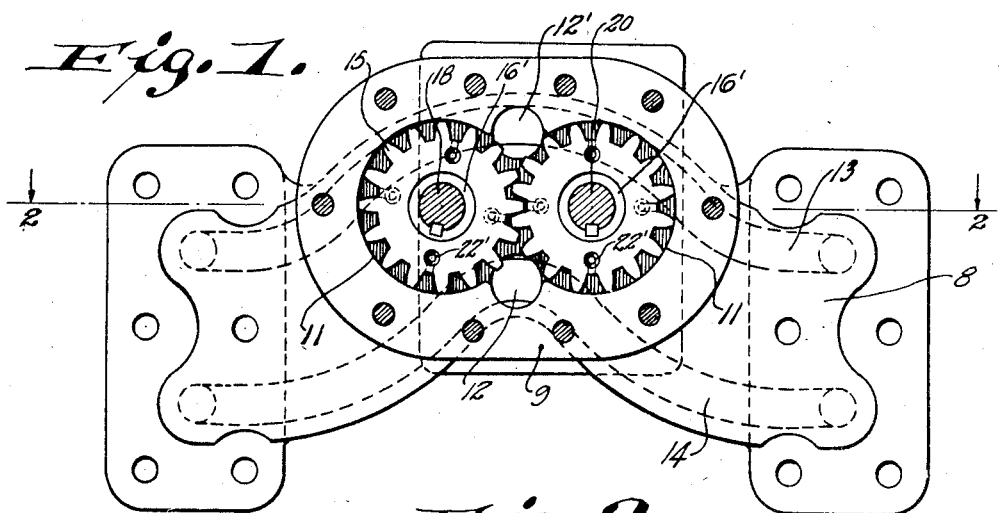
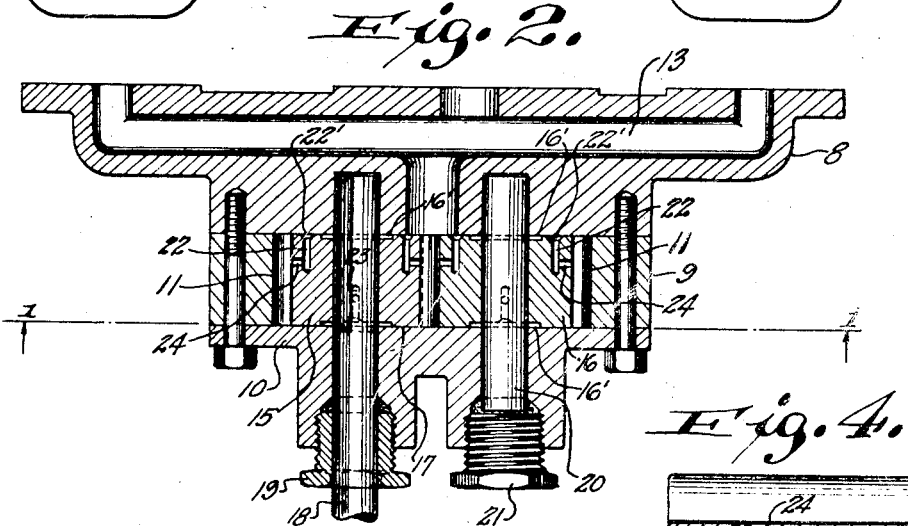
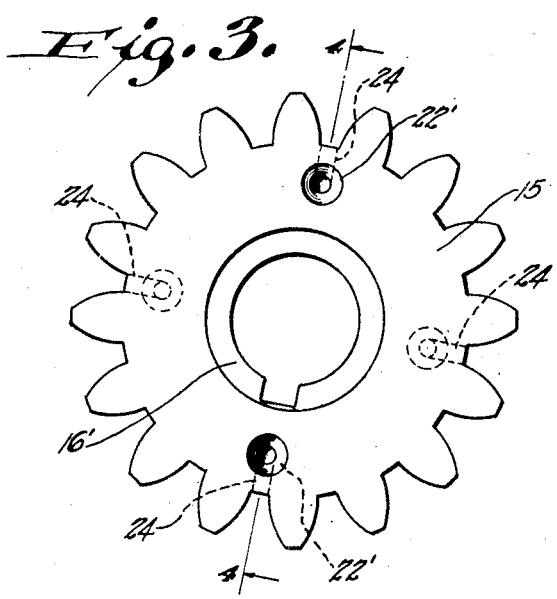
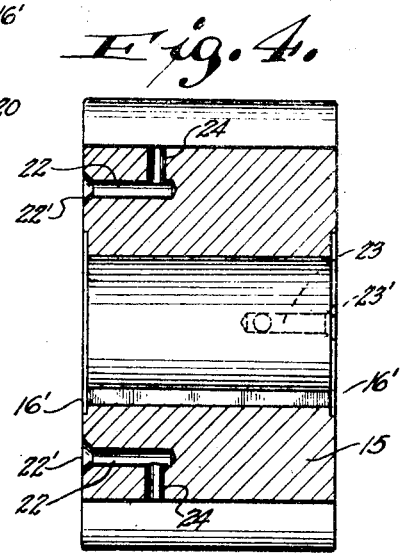
INVENTOR.
Julius P. Heil.
BY Morsell, Keeney & Morsell,
ATTORNEYS.

Patented June 24, 1930

1,765,724

UNITED STATES PATENT OFFICE

JULIUS P. HEIL, OF MILWAUKEE, WISCONSIN, ASSIGNOR TO THE HEIL CO., OF MILWAUKEE, WISCONSIN, A CORPORATION OF WISCONSIN

OIL PUMP

Application filed February 13, 1928. Serial No. 253,930.

This invention relates to improvements in oil pumps.

Hydraulic hoists for dump trucks are usually operated by gear pumps which are adapted to force oil above or below the pistons operating the raising and lowering mechanism of the hoist. One of the gears of the gear pump is usually connected to the transmission of the truck by means of a shaft, and the shaft is provided with universal joints to permit the tilting of the pump, in raising or lowering the body of the truck. As the distance between the pump and the transmission increases and diminishes with the movement of the body it is necessary to provide a sliding connection between the shaft and one of the members, and this is usually formed in the connection between the pump shaft and the transmission. In use it has been found that the sliding connection between the pump shaft and the transmission, while turning to raise or lower the body of the truck, creates considerable friction in the sliding connection, and this in turn imparts considerable friction to one or the other faces of the gear to which the pump shaft is connected. Therefore it is of the greatest importance to provide sufficient lubrication between the opposite faces of the pump gear connected to the pump shaft during the raising and lowering operation. A construction such as described above is clearly shown in Julius P. Heil's application, Serial No. 1,594,728, for Hydraulic hoist.

It is one of the objects of the present invention to overcome the before-mentioned objections and to provide an oil pump having a gear oiler which will positively and constantly force the lubricant between the opposite faces of the pump gears and the casing and within the shaft bearings to lubricate the same.

It is a further object of this invention to provide an oil pump having a gear oiler by means of which the lubricant is forced in equal amounts on to both faces of the gears to eliminate excessive friction and wear caused by the end thrust to which the gears are subjected.

It is a more specific object of this invention to provide an oil pump in which the gears are provided with separate oil ducts for each gear face, instead of with a single duct extending all the way through, to insure proper lubrication of both gear faces whether or not one of the gear faces is forced tightly against the adjacent casing wall by the end thrust of the reciprocating shaft.

It is a further object of this invention to provide an oil pump gear oiler which will perform the functions desired without the use of parts other than the pump itself.

A further object of the invention is to provide an oil pump in which the shafts on which the gears are mounted can be readily interchanged if desired.

It is a further object of this invention to provide an improved oil pump which is of simple construction, is strong and durable, and well adapted for the purpose described.

With the above and other objects in view the invention consists of the improved oil pump, and all its parts and combinations as set forth in the claims, and all equivalents thereof.

In the accompanying drawing, in which the same reference characters designate the same parts in all of the views:

Fig. 1 is a vertical sectional view taken on line 1—1 of Fig. 2;

Fig. 2 is a horizontal sectional view taken on line 2—2 of Fig. 1;

Fig. 3 is an enlarged detail view of one of the gears; and

Fig. 4 is a sectional view taken on line 4—4 of Fig. 3.

Referring to the drawing, the numeral 8 indicates a conduit casing adapted to be connected to the cylinders of a hydraulic dump truck, 9 a pump casing connected thereto, and 10 the cover thereof. Said casing 9 is formed with two intersecting gear chambers 11, of which the conduit casing 8 forms one inner flat face thereof. The gear chambers are of circular formation, and at the upper and lower points of intersection of the curves, inlet and outlet openings 12 and 12' are provided which communicate with the ducts 13 and 14 of the conduit casing 8. Intermeshing pump gears 15 and 16 fit snugly within the gear chambers, and have, with the exception of small hub recesses 16′, flat faces 17 which bear against the flat faces of the chambers. The gear 15 is keyed on a driving shaft 18 which extends through a stuffing nut 19, and through bearing portions of the casing and cover, while the gear 16 is mounted on a short shaft journaled within the casing. A plug 21 closes the opening in the cover 10, into which the shaft 20 extends. As the openings for the nuts 19 and 21 are the same size, the shafts 18 and 20 may be readily interchanged if it is found to be desirable to have the drive shaft on the other gear. Each gear 15 and 16 on corresponding sides of the shaft 18 and 20 is provided with a pair of oppositely positioned oil ducts 22 for the upper side of the gear, and another pair of ducts 23 for the lower side, the lower ducts being positioned midway between the upper ducts. Each of the ducts extends only partially through the gear in a line parallel to the axis of the shaft, and at its outer end portion is bevelled or tapered as indicated by the numerals 22′ and 23′. Each duct is also intersected by a transverse duct 24 which extends radially outwardly from the ducts 22 and 23 to one of the intertooth spaces of the gear. By thus providing a set of ducts for each face, proper lubrication is assured, as there is no danger of one face receiving a greater part of the oil as is the case in other types of ducts.

In operation, the oil in the opening 12 is under pressure due to the rotation of the gears, and every time one of the ducts 24 turns into registration with said outlet opening, the oil under pressure will be forced through said duct and into one of the ducts 22 or 23 to the faces of the gear. Now, as the intertooth space is entered by the tooth of the other gear, the oil in the intertooth space will be forced through the ducts and between the faces of the gear and casing chamber. As the ducts 22 and 23 are similar in size and shape, an equal amount of oil will be distributed on each face of the gear, whether or not one of the pump gear faces is forced tightly against the adjacent casing wall by the end thrust of the reciprocating shaft. The bevelled end portions of the ducts serve to spread the oil on the inner faces of the casing, and the rotation of the gears carries the oil circumferentially around the said casing faces and also works the oil into the hub recesses and the shaft bearings of the casing so that a constant supply of oil is fed to the bearing parts to lubricate the same.

From the foregoing description it may be seen that the improved oil pump is simple in construction and well adapted for the purpose described.

What I claim is:

1. A pump oiler comprising a casing having gear recesses and inlet and outlet openings in communication with said recesses, and intermeshing gears positioned in said recesses, said gears having a distinct, independent interior oil duct for each face, said ducts extending from peripheral portions of said gears to a side face thereof.

2. A pump oiler comprising a casing having gear recesses and inlet and outlet openings in communication with said recesses, and intermeshing gears positioned in said recesses, said gears having a distinct, independent interior oil duct for each face, said ducts extending from a face partially through said gear and having other interior ducts intersecting the first mentioned ducts and extending to peripheral portions of the gears.

3. A pump oiler comprising a casing having gear recesses and inlet and outlet openings in connection with said recesses, and intermeshing gears positioned in said recesses, said gears having a distinct, independent pair of oppositely positioned oil ducts for each face, the duct for one face being positioned between the ducts for the other face, and said ducts extending from peripheral portions of the gears to a side face thereof.

4. A pump oiler, comprising a casing having circular intersecting gear recesses with flat side faces and inlet and outlet openings, and intermeshing gears positioned in said recesses and having flat side faces which closely fit the side faces of the casing, said gears having a distinct, independent transverse oil duct for each face extending partially through the gears, and having other interior ducts which extend radially between the side faces from the transverse ducts to the peripheries of the gears to receive oil therein under pressure.

5. A pump oiler comprising a casing having circular intersecting gear recesses with flat side faces and inlet and outlet openings, and intermeshing gears positioned in said recesses, and having flat side faces which closely fit the side faces of the casing, said gears also having a distinct, independent transverse oil duct for each face which has a tapered end portion, said gears also having other ducts which extend from the transverse ducts radially outwardly and between the opposite faces to the intertooth spaces of the gears to receive oil therefrom under direct pressure from the intertooth spaces.

6. A pump oiler comprising a conduit casing having inlet and outlet openings, a pump casing mounted thereon and having circular intersecting gear recesses, a cover mounted on the pump casing, said conduit casing and cover having flat inner faces, shafts journaled in the conduit casing and the cover and one of said shafts extending through the cover, and intermeshing gears positioned in said pump casing and having flat sides which closely fit the inner flat faces of the conduit casing and cover, said gears having a distinct, independent transverse oil duct for each face which extends partially through the gear and also having other ducts which extend from the transverse ducts radially outwardly and between the opposite faces to intertooth spaces of the gears to receive oil therefrom under direct pressure from the intertooth spaces.

In testimony whereof, I affix my signature.

JULIUS P. HEIL.